Jan. 31, 1933.   I. H. SARGENT   1,896,018
MOVABLE AUTOMOBILE HEADLIGHT
Filed April 30, 1931   2 Sheets-Sheet 1

I. H. Sargent, INVENTOR
BY Victor J. Evans
and Co.   ATTORNEY

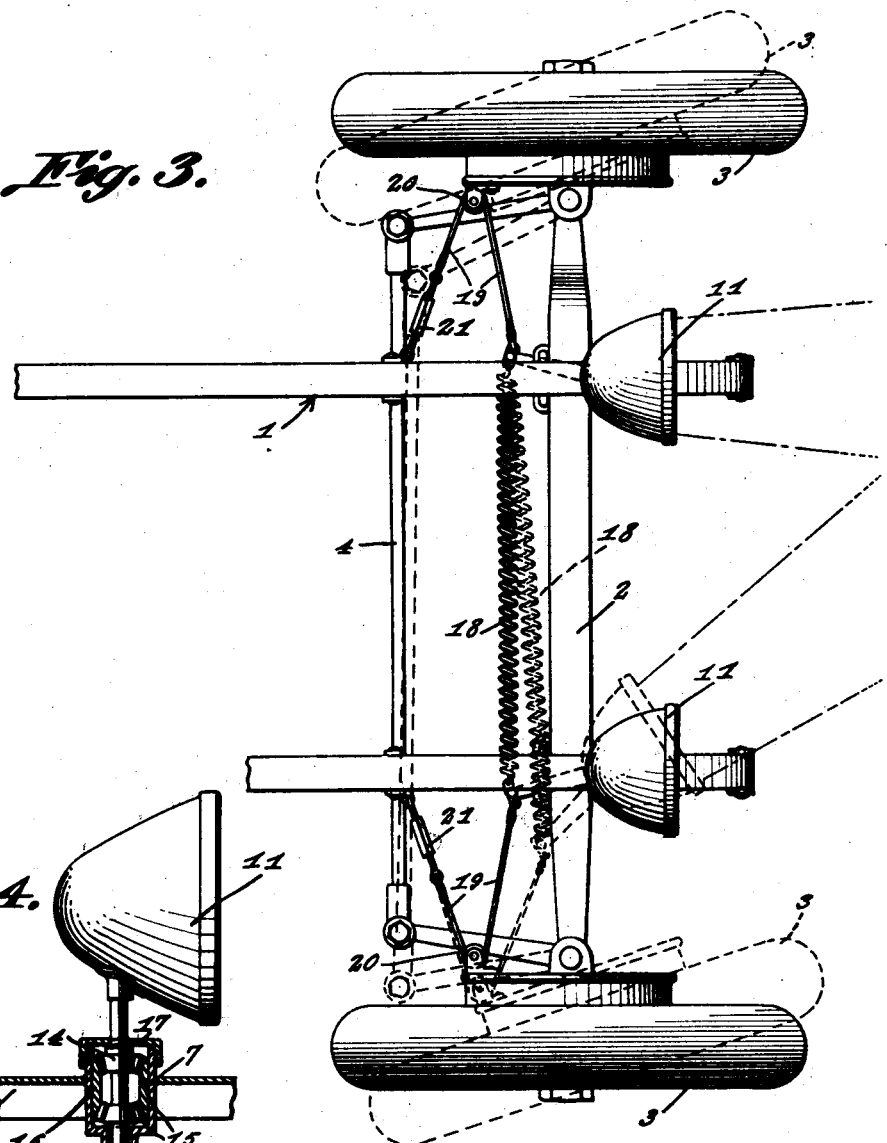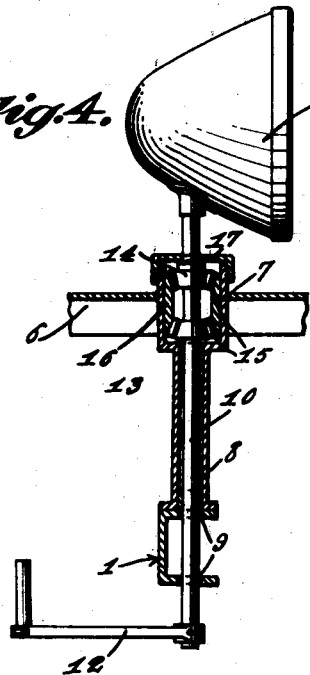

Patented Jan. 31, 1933

1,896,018

UNITED STATES PATENT OFFICE

IRVA H. SARGENT, OF LAWRENCEBURG, TENNESSEE

MOVABLE AUTOMOBILE HEADLIGHT

Application filed April 30, 1931. Serial No. 534,025.

This invention relates to movable headlights for motor vehicles and has for the primary object, the provision of means affected by the movements of the front wheels of the vehicle when steering the latter to impart a turning movement to either of the headlights depending in which direction the vehicle is turned, so that one headlight directs the rays of light therefrom angularly to the rays of light from the other headlight for efficiently illuminating the roadway when travelling on a curve and said moved or turned headlight adapted to automatically assume a normal position when the vehicle is again steered straight or travelling on a straight course.

Another object of this invention is the provision of movable headlights for motor vehicles of the above stated character which will be simple, durable and efficient and which may be manufactured and sold at a comparatively low cost.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a front elevation partly in section illustrating movable headlights mounted at the front end of a motor vehicle with their operating means associated with the front wheels.

Figure 3 is a fragmentary plan view of the motor vehicle chassis showing my invention applied thereto.

Figure 4 is a detail sectional view illustrating the mounting of one of the headlight standards.

Figure 1:
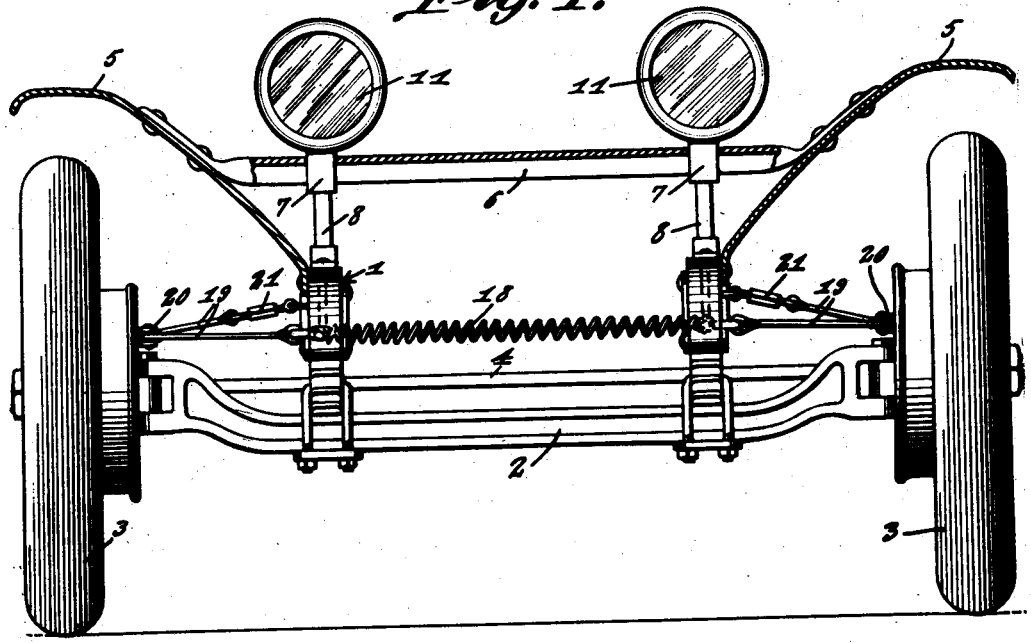
Figure 2:
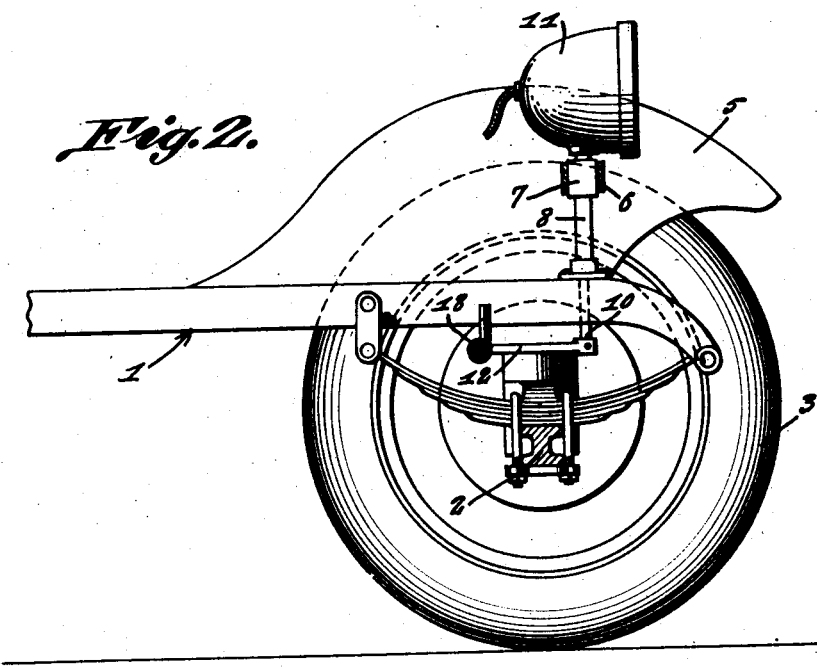
Figure 2 is a fragmentary longitudinal sectional view illustrating the same.

Referring in detail to the drawings, the numeral 1 indicates a fragmentary portion of the chassis of a motor vehicle having associated with the front end thereof the axle 2 and front wheels 3 adapted to be steered through the ordinary steering mechanism 4. The chassis or frame 1 has associated therewith the usual front fenders 5 for the front wheels 3 and are connected together by a brace or bar 6. The foregoing description relates to a well known construction employed on motor vehicles and the brace 6 has secured thereto housings 7 provided with depending tubular portions 8 resting upon the frame or chassis 1. The side members of the frame or chassis 1 on which the tubular portions 8 rest have openings 9 aligning with the tubular portions 8 so that lamp standards 10 may extend through the housings and tubular portions below the chassis 1 and carry at their upper ends headlights 11 while their lower ends have secured thereto arms 12. Cone shaped bearings 13 and 14 are mounted on the standards 10 within the housing 7 and engage roller bearings 15 that have contact with bearing surfaces of sleeves 16 mounted on the housings. The cone-shaped bearings 14 are adjustably mounted on the standards by nuts 17 whereby wear between the movable parts may be taken up. A coiled spring 18 is connected with the arms 12 below the chassis for the purpose of normally maintaining the headlights 11 positioned so that the rays of light therefrom will be straight ahead of the vehicle.

Cables 19 are secured to the ends of the arms and pass over pulleys 20 secured to the brake drums of the wheels 3 and are attached to turn buckles 21 pivoted to the frame 1, providing means whereby one of the headlights will be turned angularly to the other headlight when the front wheels of the vehicle are positioned to steer the vehicle on a left hand turn, so that the driver of the vehicle will have illumination both straight ahead and angularly to the vehicle when travelling on a curve. It is to be understood that when the vehicle is travelling on a turn to the left, the right hand headlight is the one turned to direct the rays of light therefrom onto the curve and when the motor vehicle is steered to the right, the left hand headlight is turned angularly to throw the rays of light therefrom on the curve. As soon as the steering wheels assume a normal or straight position, the headlight which has been turned angularly to the vehicle assumes a normal or straight position relative to the vehicle by the influence of the spring 18.

While I have shown and described the preferred embodiment of my invention, it will be understood that minor changes in construction, combination and arrangement of parts may be made without departing from the spirit and scope of my invention, as claimed.

Having thus described my invention, what I claim is:

In combination with a motor vehicle having pivotally mounted front steering wheels provided with brake drum shield plates movable with the wheels and a fender brace, journals carried by the brace, lamp standards carried by said journals, headlights secured to the standards, arms secured to the standards and extending rearwardly therefrom, a coiled spring connecting said arms, pulleys secured to the shield plates rearwardly of the pivots of the wheels, and flexible elements trained over the pulleys and secured to the arms and adjustably secured to the vehicle for turning one headlight in the same direction with the turning of the front wheels and permitting the other headlight to remain straight with respect to the front of the motor vehicle.

In testimony whereof I affix my signature.

IRVA H. SARGENT.